US010267517B2

(12) United States Patent
O'Boyle et al.

(10) Patent No.: US 10,267,517 B2
(45) Date of Patent: Apr. 23, 2019

(54) METHOD AND SYSTEM FOR IMPROVING BOILER EFFECTIVENESS

(71) Applicant: ARVOS Ljungstrom LLC, Wellsville, NY (US)

(72) Inventors: Kevin O'Boyle, Alma, NY (US); Glenn D. Mattison, Machias, NY (US)

(73) Assignee: ARVOS Ljungstrom LLC, Wellsville, NY (US)

( * ) Notice: Subject to any disclaimer, the term of this patent is extended or adjusted under 35 U.S.C. 154(b) by 335 days.

(21) Appl. No.: 15/205,243

(22) Filed: Jul. 8, 2016

(65) Prior Publication Data
US 2018/0010792 A1    Jan. 11, 2018

(51) Int. Cl.
| | |
|---|---|
| *F23J 15/02* | (2006.01) |
| *B01D 53/30* | (2006.01) |
| *B01D 53/50* | (2006.01) |
| *F23J 15/06* | (2006.01) |
| *F23J 15/08* | (2006.01) |
| *F22B 37/00* | (2006.01) |
| *F22B 37/02* | (2006.01) |

(52) U.S. Cl.
CPC ............ *F23J 15/022* (2013.01); *B01D 53/30* (2013.01); *B01D 53/50* (2013.01); *B01D 53/502* (2013.01); *F22B 37/008* (2013.01); *F22B 37/025* (2013.01); *F23J 15/06* (2013.01); *F23J 15/08* (2013.01); *F23J 2215/20* (2013.01); *F23J 2217/00* (2013.01); *F23L 2900/15043* (2013.01)

(58) Field of Classification Search
CPC .. F23J 15/022; F23J 15/06; F23J 15/08; F23J 2215/20; F23J 2217/00; F22B 37/008; F22B 37/025; B01D 53/30; B01D 53/50

USPC ............................................. 110/216; 34/380
See application file for complete search history.

(56) References Cited

U.S. PATENT DOCUMENTS

| | | | | | |
|---|---|---|---|---|---|
| 4,305,909 | A | * | 12/1981 | Willett .................. | B01D 47/06 422/169 |
| 4,411,136 | A | * | 10/1983 | Funk .................... | B01D 53/002 60/648 |
| 6,907,845 | B2 | * | 6/2005 | Krebs ...................... | F23J 15/06 110/204 |

(Continued)

FOREIGN PATENT DOCUMENTS

| | | | | | |
|---|---|---|---|---|---|
| CA | 2786010 | A1 | * | 7/2011 | ........... F01K 23/062 |
| CA | 2786010 | C | * | 7/2016 | ........... F01K 23/062 |

(Continued)

*Primary Examiner* — Stephen M Gravini
(74) *Attorney, Agent, or Firm* — Murtha Cullina LLP

(57) ABSTRACT

A method for improving effectiveness of a steam generator system includes providing air to an air preheater in excess of that required for combustion of fuel and providing the air at a mass flow such that the air preheater has a cold end metal temperature that is no less than a water dew point temperature in the air preheater and such that the cold end metal temperature is less than a sulfuric acid dew point temperature. The method includes mitigating $SO_3$ in the flue gas which is discharged directly from the air preheater to a particulate removal system and then directly into a flue gas desulfurization system. Flue gas reheat air is fed from the air preheater to heat the flue gas prior to entering a discharge stack to raise the temperature of the flue gas to mitigate visible plume exiting and to mitigate corrosion in the discharge stack.

44 Claims, 6 Drawing Sheets

(56) References Cited

U.S. PATENT DOCUMENTS

| | | | | |
|---|---|---|---|---|
| 8,695,516 | B2 * | 4/2014 | Nijhawan | B01D 53/83 110/345 |
| 8,715,600 | B1 * | 5/2014 | Gayheart | B01D 53/83 423/210 |
| 8,752,384 | B2 * | 6/2014 | Polvi | F01K 23/062 60/670 |
| 8,755,940 | B2 * | 6/2014 | Lou | F22B 31/0076 422/105 |
| 9,192,890 | B2 * | 11/2015 | Warren | B01D 53/508 |
| 9,557,119 | B2 * | 1/2017 | Birmingham | F28D 19/044 |
| 9,598,742 | B2 * | 3/2017 | Birmingham | C21B 9/14 |
| 9,861,930 | B2 * | 1/2018 | Gansley | B01D 53/40 |
| 10,016,762 | B2 * | 7/2018 | Chen | B02C 15/003 |
| 2004/0237909 | A1 * | 12/2004 | Krebs | F23J 15/06 122/459 |
| 2011/0073023 | A1 * | 3/2011 | Birmingham | C21B 9/14 110/345 |
| 2018/0010792 | A1 * | 1/2018 | O'Boyle | F23J 15/022 |

FOREIGN PATENT DOCUMENTS

| | | | | |
|---|---|---|---|---|
| WO | WO 2010129092 A1 * | 11/2010 | | F28D 19/044 |
| WO | WO 2011091424 A1 * | 7/2011 | | F01K 23/062 |

* cited by examiner

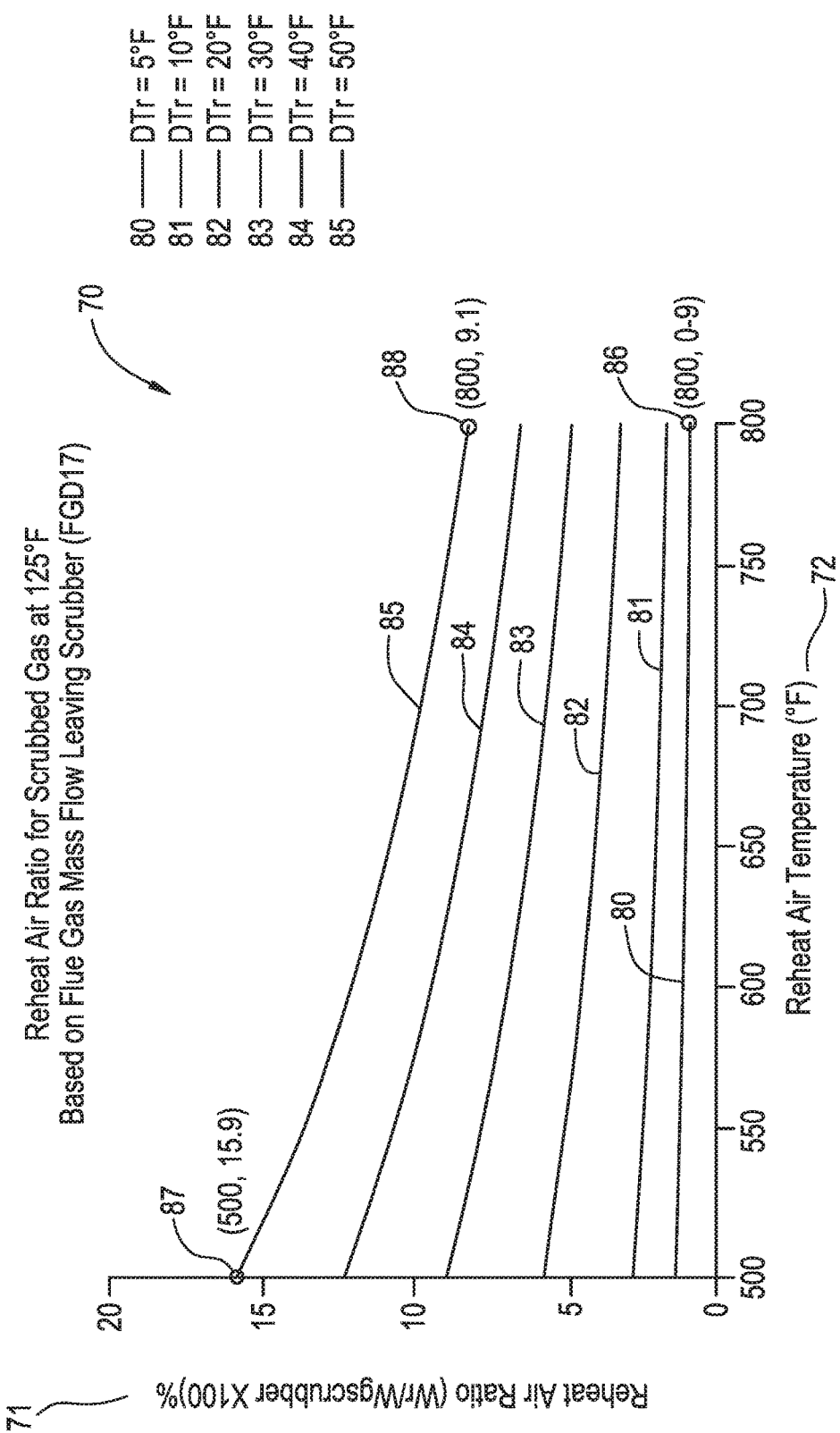

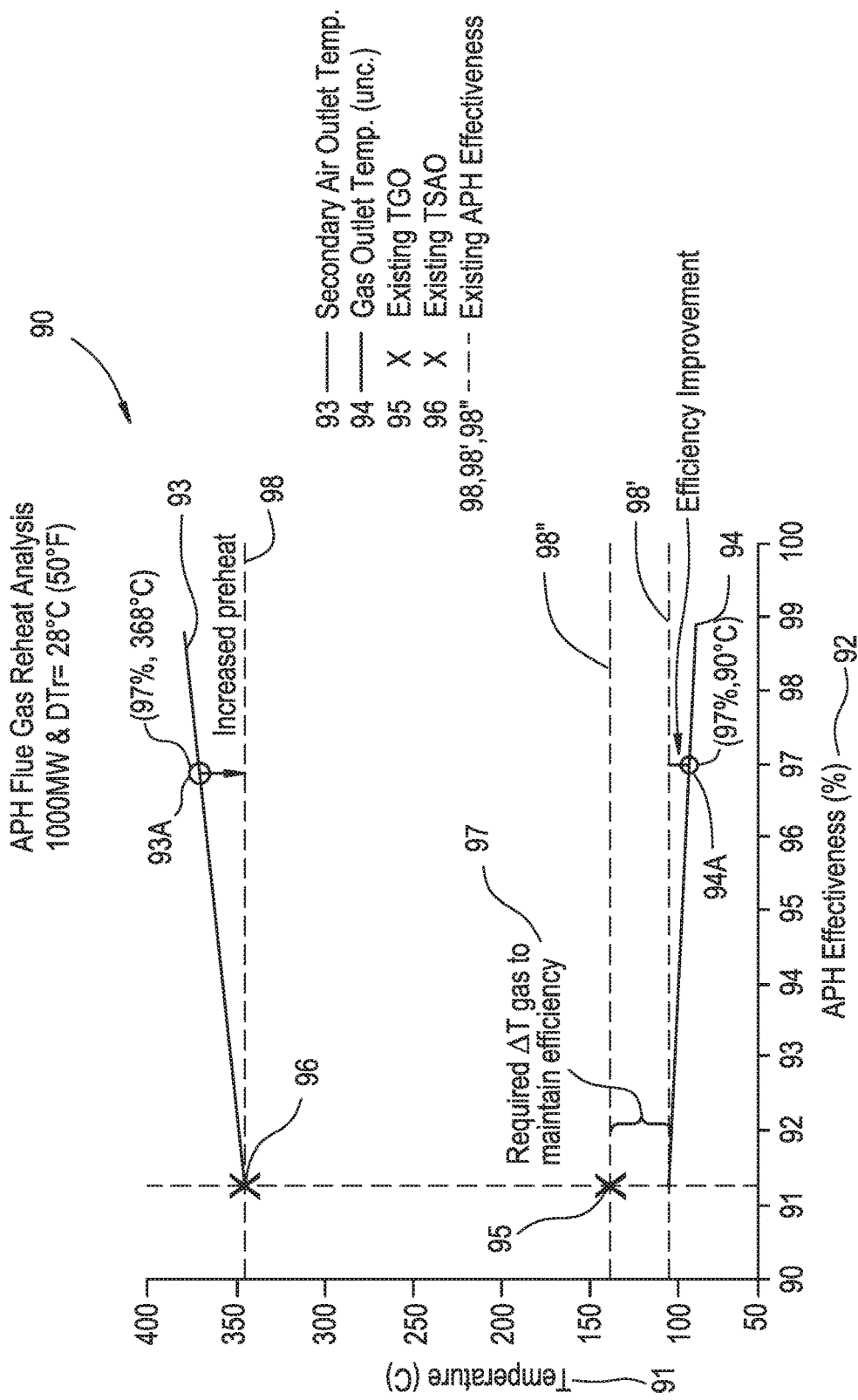

METHOD AND SYSTEM FOR IMPROVING BOILER EFFECTIVENESS

FIELD OF THE INVENTION

The present invention relates generally to a method and system for improving the effectiveness of a fossil fuel fired steam generator and the effectiveness of particulate removal, and is more particularly directed to a method and system for improving the effectiveness of an air preheater by reducing fouling and improving the thermal efficiency of the fossil fuel fired steam generator and the efficiency of an electrostatic precipitator by using $SO_3$ mitigation upstream of the air preheater, excess air to the air preheater and stack gas reheat to thereby eliminate one or more heat exchangers and eliminate one or more fans downstream of the air preheater.

BACKGROUND OF THE INVENTION

There are many types of steam generator systems that are employed for the generation of steam for use in the generation of electricity and chemical processing plants. Some of the steam generation systems combust fossil fuel such as coal, natural gas and oil in a steam generator vessel. An air supply to the steam generator vessel is required to provide oxygen for the combustion of the fuel. The combustion of the fuel results in high temperature combustion byproducts in a flue gas stream discharged from the steam generator vessel. To improve the thermal efficiency of the steam generator system the air supply to the steam generator vessel is heated by recovering heat from the flue gas stream in an Air Preheater (APH), such as a rotary APH.

Efficiency of the APH can be increased by using higher efficiency heat transfer elements and heat transfer elements with a greater heat transfer area. However, those skilled in the relevant art have not been able to realize the full potential of increased APH efficiency available through the use of higher efficiency heat transfer elements and greater heat transfer area of the heat transfer elements, because of operation limitations relating to the control of pollutants, as described herein.

The byproducts in the flue gas stream can include particulate matter and pollutants. For example, the combustion of coal results in combustion byproducts such as particulate matter in the form of fly ash and pollutants such as nitrogen oxides ($NO_x$), sulfur dioxide $SO_2$ and sulfur trioxide $SO_3$ (collectively often referred to as $SO_x$). The $SO_2$ is formed as a result of the combustion of sulfur containing fuels such as high sulfur coal. The $SO_3$ is formed by oxidation of the $SO_2$ for example when oxygen content in the flue gas is too high or when the flue gas temperature is too high (e.g., greater than 800° C.). The $SO_3$ can form a liquid aerosol known as sulfuric acid ($H_2SO_4$) mist that is very difficult to remove.

Environmental laws and regulations limit the amount of discharge of particulate matter and pollutants into the environment. Thus, various treatment systems have been employed to control the discharge of particulate matter and pollutants. For example, Selective Catalytic Reduction (SCR) is a treatment means for converting nitrogen oxides, also referred to as $NO_x$, with the aid of a catalyst into diatomic nitrogen ($N_2$) and water ($H_2O$). Particulate control systems such as bag houses, wet Electro Static Precipitators (ESPs) and dry ESPs can be employed to remove particulate matter from the flue gas stream. Dry ESPs are more efficient and easier to maintain than wet ESPs, but dry ESPs require a drier flue gas stream than wet ESPs. Creating a dry flue gas stream can be difficult because as the flue gas temperature decreases below the dew point of $SO_3$ at a cold-end of the APH, condensation can occur, thereby causing $SO_3$ to form $H_2SO_4$ and a relatively wet flue gas. Moreover, if the flue gas contains the $H_2SO_4$ mist, then the less efficient wet ESP is typically employed to remove the $H_2SO_4$. In addition, the ESPs tend to experience dust fouling (e.g., an undesirable accumulation of fly ash on ESP collector plates and removal troughs) when the temperature of the flue gas is high (e.g., 130° C. or greater).

Another system employed for the control of particulate matter and pollutants is a Flue Gas Desulfurization (FGD) system. The FGD systems are primarily directed to removing any $SO_2$, for example, by the use of $SO_2$ absorbers. Wet $SO_2$ absorbers typically spray water mixed with a sorbent on a stream of flue gas flowing through the $SO_2$ absorber to absorb the $SO_2$ from the flue gas. The flue gas exiting the $SO_2$ absorber is saturated with water that contains some $SO_2$. One operational limitation of the FGD systems is the flue gas exiting the $SO_2$ absorber can be highly corrosive to any downstream equipment such as fans, ducts, and stacks. Another operational limitation of the FGD systems is that the $SO_2$ absorbers require a substantial water supply and sorbent regeneration equipment.

One operational limitation relating to APH's is that employing heat transfer elements with increased heat transfer efficiency and area can cause the flue gas temperature to decrease below the dew point of $SO_3$ at which temperature, condensation at a cold-end of the APH can occur. The $SO_3$ reacts with the water to form sulfuric acid $H_2SO_4$ which condenses on the APH heat transfer elements. The particulate matter can adhere to the condensed $H_2SO_4$ causing fouling of the APH. Based on this operational limitation, those skilled in the relevant art have been discouraged from reducing the component temperature and/or flue gas temperature exiting the APH to below the dew point of $SO_3$ and from further employing APH's with increased efficiency heat transfer elements and heat transfer area. This inability to completely realize the full potential of increasing the efficiency of the APH therefore limits the ability to increase the thermal efficiency of the steam generator system to be increased to its full potential.

As shown in FIG. 1 a prior art steam generator system is generally designated by the numeral 100. The steam generator system 100 includes a steam generator vessel 101 that includes a flue gas outlet 101B that is in communication with a Selective Catalytic Reduction (SCR) system 102 via an SCR inlet 102A. The SCR system 102 includes an SCR outlet 102B that is in communication with an air preheater (APH) 103 via a first APH inlet 103A. An air supply line 103D is in communication with a second APH inlet 103C. The APH 103 includes a first APH outlet 103E that is in communication with an inlet 101A to the steam generator vessel 101. The APH 103 includes a second APH outlet 103B that is in communication with an inlet 104A of an Electro Static Precipitator (ESP) 104. The ESP 104 includes an outlet 104B that is in communication with an inlet 105A of a fan 105 (e.g., an induced draft fan). The fan 105 includes an outlet 105B that is in communication with a hot side inlet 106XA of a heat recovery section 106X of a gas-to-gas heat exchanger (GGH). The heat recovery section 106X has a first outlet 106XB that is in communication with an inlet 107A of a Flue Gas Desulfurization (FGD) system 107. The FGD system 107 includes an outlet 107B that is in communication with a cold side inlet 106YA of a re-heating section 106Y of the GGH. The re-heating section 106Y includes a second outlet 106YB that is in communication with a fan inlet 108A of a fan 108. The heat recovery section 106X includes an inlet 106XC that is in communication with an outlet 106YD of the re-heating section 106Y via a sealed conduit 106Q for conveying a heat transfer medium therein. The heat recovery section 106X includes an outlet 106XD that is in communication with an inlet 106YC of the re-heating section 106Y via sealed conduit 106R for conveying the heat transfer medium therein. The fan 108 includes an outlet 108B that is in communication with an inlet 109A of an exhaust stack 109. The exhaust stack 109 includes a stack outlet 109B.

Operation of the steam generator system 100 involves supplying a fuel such as pulverized coal to the steam generator vessel 101. Air for combustion of the coal is provided via the air supply 103D which is heated in the APH 103 via a stream of hot flue gas that is discharged from the steam generator vessel 101 after having been treated for $NO_X$ reduction in the SCR 102. Flue gas that is discharged from the APH outlet 103B and supplied to the ESP 104 typically has a temperature of about 130° C. Operation of the ESP 104 at 130° C. tends to cause dust fouling in the ESP 104, as described herein. In order to increase the efficiency of $SO_2$ removal in the FGD system 107, the temperature of the flue gas is reduced to about 90° C. in the GGH 106. However, because of pressure losses through the GGH 106 the fan 105 is required to increase the pressure of the flue gas to ensure continued flow at sufficient velocity through the GGH 106 and the FGD system 107. The desulfurization processing in the FGD system 107 reduces the temperature of the flue gas to about 50° C. as a result of contact the water in the FGD system 107. Discharge of flue gas into the stack 109 at such low temperatures tends to cause corrosion problems and a visible plume at the discharge 109B of the stack 109. To mitigate these problems, the flue gas is recirculated back into the GGH 106 to reheat the flue gas to about 90° C. Recirculation of the flue gas back through the GGH 106 results in further pressure losses and the fan 108 is required to increase pressure and velocity of the flue gas to an acceptable magnitude.

Drawbacks of the steam generator system 100 include: 1) the reduction in overall thermal efficiency due to the power consumed by the fans 105 and 108; 2) the dust fouling problems in the ESP 104 due to the high temperature of the flue gas; 3) the less than optimum APH 103 which cannot employ heating elements having a greater efficiency and area; 4) the inability to employ a dry ESP because of the presence of sulfuric acid $H_2SO_4$ in the flue gas; and 5) inefficiencies of the FGD 107 due to the high $SO_3$ concentration of greater than 5 ppm in the flue gas.

As shown in FIG. 2, another prior art steam generator system 101' is similar, in some regards, to the prior art steam generator system 100 of FIG. 1. Thus, similar components are designated with similar reference characters followed by a prime designation.

As shown in FIG. 2 the prior art steam generator system 100' includes a steam generator vessel 101' that includes a flue gas outlet 101B' that is in communication with a Selective Catalytic Reduction (SCR) system 102' via an SCR inlet 102A'. The SCR system 102' includes an SCR outlet 102B' that is in communication with an air preheater (APH) 103' via a first APH inlet 103A'. An air supply line 103D' is in communication with a second APH inlet 103C'. The APH 103' includes a first APH outlet 103E' that is in communication with an inlet 101A' to the steam generator vessel 101'. The APH includes a second APH outlet 103B' that is in communication with a hot side inlet 106XA' of a heat recovery section 106X' of a gas-to-gas heat exchanger GGH. The heat recovery section 106X' has a first outlet 106XB' that is in communication with an inlet 104A' of an Electro Static Precipitator (ESP) 104'. The ESP 104' includes an outlet 104B' that is in communication with an inlet 105A' of a fan 105' (e.g., an induced draft fan). The fan 105' includes an outlet 105B' that is in communication with an inlet 107A' of a Flue Gas Desulfurization (FGD) system 107'. The FGD system 107' includes an outlet 107B' that is in communication with a cold side inlet 106YA' of a re-heating section 106Y' of the GGH. The re-heating section 106Y' includes an outlet 106YB' that is in communication with a fan inlet 108A' of a fan 108'. The heat recovery section 106X' includes an inlet 106XC' that is in communication with an outlet 106YD' of the re-heating section 106Y' via a sealed conduit 106Q' for conveying a heat transfer medium therein. The heat recovery section 106X' includes an outlet 106XD' that is in communication with an inlet 106YC' of the re-heating section 106Y' via sealed conduit 106R' for conveying the heat transfer medium therein. The fan 108' includes an outlet 108B' that is in communication with an inlet 109A' of an exhaust stack 109'. The exhaust stack 109' includes a stack outlet 109B'.

The steam generator system 101' differs from the steam generator system 101 in that the GGH 106 is positioned between the APH 103' and the ESP 104 in an effort to raise the temperature of the flue gas to 90° C. before entering the ESP 104'. While the steam generator system 101' attempts to improve the operation of the ESP 104', the other drawbacks of the steam generator system 101 remain.

Based on the foregoing there is a need for a steam generator system with improved thermal efficiency and particulate matter and pollution treatment systems.

SUMMARY

There is disclosed herein a method for improving effectiveness of a steam generator system. The method includes providing a steam generator system having a steam generator vessel, an air supply system, an air preheater, a particulate removal system (e.g., a dry electro static precipitator and/or a fabric filter), a flue gas desulfurization system, and a flue gas discharge stack. The air supply system is in communication with the steam generator vessel through the air preheater. The steam generator vessel is in communication with the discharge stack through the air preheater, the particulate removal system and the flue gas desulfurization system. The particulate removal system is located downstream of the air preheater. The flue gas desulfurization system is located downstream of the particulate removal system and the discharge stack is located downstream of the flue gas desulfurization system. The method includes having the air supply system provide a first amount of air to the air preheater. The first amount of air is of a magnitude in excess of that required for combustion of fuel in the steam generator vessel. The method includes having the air preheater provide the first amount of air at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The method includes mitigating $SO_3$ in the flue gas mixture generated in the steam generator vessel. The mitigating of $SO_3$ occurs before the flue gas mixture enters the air preheater. The method includes configuring the air preheater to heat the first amount of air to a second temperature of about 288° C. to 399° C. (550° F. to 750° F.). The method also includes supplying a first portion of the first amount of air as combustion air to the steam generator vessel for combustion of the fuel. The flue gas mixture is discharged at the first temperature, directly from the air preheater to the particulate removal system thereby removing particulate from the flue gas mixture and creating a first treated flue gas mixture. The method further includes discharging the first treated flue gas mixture from the particulate removal system directly into the flue gas desulfurization system thereby creating in and discharging from the flue gas desulfurization system, a second treated flue gas mixture at a third temperature, for example, but not limited to 52° C. to about 60° C. (125° F. to 140° F.). The third temperature is of a magnitude sufficient to inject a second portion of the first amount of air as flue gas reheat air fed from the air preheater at the second temperature with the second flue treated flue gas mixture at the third temperature thereby creating third treated flue gas mixture at a fourth temperature (e.g., at least about 68° C. (155° F.)), prior to entering the discharge stack. The third temperature is of a magnitude sufficient to allow the flue gas reheat air to raise the fourth temperature to a magnitude sufficient to mitigate visible plume exiting the discharge stack and to mitigate corrosion in the discharge stack. Finally, the method includes admitting the third treated flue gas mixture to the discharge stack at the fourth temperature.

In one embodiment, the steam generator system further includes a selective catalytic reduction system and the steam generator vessel is in communication with the air preheater through the selective catalytic reduction system.

In one embodiment, the steam generator system further includes a flue gas reheat air particulate removal system and the air preheater is in communication with the discharge stack through the flue gas reheat air particulate removal system. The flue gas reheat air particulate removal system removes particulate contaminants from the second portion of air that are introduced to the second portion of air from leakage within the air preheater from the flue gas mixture.

In one embodiment, the steam generator system further includes a humidity sensor disposed between the steam generator vessel and the air preheater and the method includes measuring, with the humidity sensor, the humidity of the flue gas mixture to determine a magnitude of first temperature.

In one embodiment, the steam generator system further includes an infrared sensor and the method includes determining, with the infrared sensor, the cold end metal temperature in the air preheater; comparing the cold end metal temperature to the water dew point temperature; and controlling the cold end metal temperature to be no less than the water dew point temperature.

In one embodiment, the mitigating of $SO_3$ in the flue gas mixture includes supplying a low sulfur fuel to the steam generator vessel, wherein the low sulfur fuel generates less than 5 parts per million $SO_3$.

In one embodiment, the mitigating $SO_3$ in the flue gas mixture includes removing $SO_3$ in the flue gas mixture prior to admitting the flue gas mixture to the air preheater.

In one embodiment, the mitigating $SO_3$ in the flue gas mixture includes chemically rendering the $SO_3$ in the flue gas mixture into an inert salt, prior to admitting the flue gas mixture to the air preheater. For example, the chemically rendering may include spraying an aqueous suspension of a reagent containing sodium, magnesium, potassium, ammonium and/or calcium thiosulfate and containing a soluble salt compound such as one or more of thiosulfate and chloride species to create a particulate mist containing dry particles of at least one soluble salt compound that can react with the $SO_3$ in the flue gas.

In one embodiment, the method includes further providing an injection device (e.g., a duct manifold) between the flue gas desulfurization system and the discharge stack and wherein the injecting of the second portion of the first amount of air, at the second temperature, with the second flue treated flue gas mixture at the third temperature occurs in the injection device.

In one embodiment, the injection device includes the duct manifold positioned between the flue gas desulfurization system and the discharge stack. The duct manifold has an inlet for receiving the second treated flue gas mixture, a branch connection for receiving the second portion of the first amount of air and an outlet in communication with the discharge stack. In one embodiment, the injection device includes a mixer, turning vanes, and/or a tabulator device.

In one embodiment, the discharging the flue gas mixture at the first temperature, directly from the air preheater to the particulate removal system, is accomplished with no heat exchangers disposed between the air preheater and the particulate removal system.

In on embodiment, the discharging the first treated flue gas mixture from the particulate removal system directly into the flue gas desulfurization system is accomplished with no heat exchangers disposed between the particulate removal system and the flue gas desulfurization system.

In one embodiment, there are no heat exchangers disposed between the air preheater and the flue gas desulfurization system.

In one embodiment, there are no fans disposed between the flue gas desulfurization system and the discharge stack.

In one embodiment, the injection of the second portion of the first amount of air is conducted at a mass ratio of the second portion to the second treated flue gas mixture of 1 percent to 16 percent. In one embodiment, the injection of the second portion of the first amount of air is conducted at a mass ratio of the second portion to the second treated flue gas mixture of 9 percent to 16 percent.

There is disclosed herein a system for improving effectiveness of a steam generator system. The system includes a steam generator vessel, an air preheater in communication with the steam generator vessel, an air supply system configured to provide air to the steam generator vessel through the air preheater, a particulate removal system (e.g., a dry electro static precipitator and/or a fabric filter), a flue gas desulfurization system and a discharge stack. The steam generator vessel is in communication with the discharge stack through the air preheater, the particulate removal system and the flue gas desulfurization system. The particulate removal system is located directly downstream of the air preheater. The flue gas desulfurization system is located directly downstream of the particulate removal system. The discharge stack is located directly downstream of the flue gas desulfurization system. The air supply system is configured to provide a first amount of air to the air preheater. The first amount of air is of a magnitude in excess of that required for combustion of fuel in the steam generator vessel. The air preheater is configured to provide the first amount of air at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F. to about 125° C. (257° F.). The system includes SO$_3$ mitigation upstream of the air preheater, the SO$_3$ mitigation is configured to mitigate SO$_3$ in the flue gas mixture generated in the steam generator vessel. The air preheater is configured to heat the first amount of air to a second temperature of about 288° C. to 399° C. (550° F. to 750° F.). The particulate removal system is configured to convey the flue gas mixture at a third temperature, for example, but not limited to 52° C. to about 60° C. (125° F. to 140° F.), directly to the flue gas desulfurization system. An excess air duct is in communication with the air preheater. A second duct is positioned between the flue gas desulfurization system and the discharge stack. The excess air duct is configured to convey a second portion of the first amount of air as flue gas reheat air fed from the air preheater at the second temperature from the air preheater to the second duct. The system includes an injection device (e.g., a duct manifold) located between the flue gas desulfurization system and the discharge stack. The injection device is configured to discharge the flue gas into the discharge stack at a fourth temperature (e.g., at least about 68° C. (155° F.)). The third temperature is of a magnitude sufficient to allow the flue gas reheat air to raise the fourth temperature to a magnitude sufficient to mitigate visible plume exiting the discharge stack and to mitigate corrosion in the discharge stack.

In one embodiment, the steam generator system further includes a selective catalytic reduction system and the steam generator vessel is in communication with the air preheater through the selective catalytic reduction system.

In one embodiment, the steam generator system further includes a flue gas reheat air particulate removal system and the air preheater is in communication with the discharge stack through the flue gas reheat air particulate removal system operatively to remove from the second portion of air particulate contaminants introduced from leakage within the air preheater from the flue gas mixture.

In one embodiment, the steam generator system further comprises a humidity sensor disposed in the communication between the steam generator vessel and the air preheater to measure humidity of the flue gas mixture and with the humidity sensor being used to determine the magnitude of first temperature.

In one embodiment, the steam generator system further comprises an infrared sensor to determine the air preheater temperature and a control unit configured to control the cold end metal temperature above the water dew point in the air preheater.

In one embodiment, the SO$_3$ mitigation includes supplying a low sulfur fuel to the steam generator vessel. The low sulfur fuel generates less than 5 parts per million SO$_3$.

In one embodiment, the SO$_3$ mitigation includes removing SO$_3$ in the flue gas mixture prior to admitting the flue gas mixture to the air preheater.

In one embodiment, the SO$_3$ mitigation includes chemically rendering the SO$_3$ in the flue gas mixture into an inert salt, prior to admitting the flue gas mixture to the air preheater. For example, the chemically rendering may include spraying an aqueous suspension of a reagent containing sodium, magnesium, potassium, ammonium and/or calcium thiosulfate and containing one or more soluble salt compounds such as thiosulfate and chloride species to create a particulate mist containing dry particles of at least one soluble salt compound that can react with the SO$_3$ in the flue gas.

In on embodiment, the system is configured with no fans disposed between the flue gas desulfurization system and the discharge stack.

In on embodiment, the system is configured with no heat exchangers disposed between the air preheater and the flue gas desulfurization system.

In on embodiment, the system is configured with no fans disposed between the flue gas reheat air particulate removal system and the discharge stack.

There is further disclosed herein a method for retrofitting a steam generator system for improved effectiveness. The method includes removing one or more heat exchangers positioned downstream of the air preheater and reconfiguring an air supply source to the air preheater to supply a first amount of air in excess of that required for combustion of fuel in the steam generator vessel. The method also includes reconfiguring one or more of the air supply source and the air preheater such that the first amount of air is provided at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The method includes providing SO$_3$ mitigation in communication with the steam generator vessel. The SO$_3$ mitigation is configured to mitigate the SO$_3$ in the flue gas mixture generated in the steam generator vessel. The mitigating of SO$_3$ occurs before the flue gas mixture enters the air preheater. The method includes configuring the air preheater to heat the first amount of air to a second temperature which is substantially no less than the temperature of combustion air of an original system and being about of 288° C. to 399° C. (550° F. to 750° F.) to maintain or improve boiler efficiency. The method includes supplying a first portion of the first amount of air to the steam generator vessel for combustion of the fuel. The method further includes discharging the flue gas mixture at the first temperature, directly from the air preheater to the particulate collection system, thereby removing particulate from the flue gas mixture and creating a first treated flue gas mixture. The method also includes, discharging the first treated flue gas mixture from the particulate removal system directly into the flue gas desulfurization system thereby creating in and discharging from the flue gas desulfurization system, a second treated flue gas mixture at a third temperature, for example, but not limited to 52° C. to about 60° C. (125° F. to 140° F.). The method includes injecting a second portion of the first amount of air as flue gas reheat air fed from the air preheater at the second temperature with the second flue treated flue gas mixture at the third temperature, thereby creating third treated flue gas mixture at a fourth temperature (e.g., at least about 68° C. (155° F.)), prior to entering the discharge stack. The method also includes, admitting the third treated flue gas mixture to the discharge stack at the fourth temperature. The third temperature is of a magnitude sufficient to allow the flue gas reheat air to raise the fourth temperature to a magnitude sufficient to mitigate visible plume exiting the discharge stack and to mitigate corrosion in the discharge stack.

In one embodiment, the retrofit method includes replacing at least a portion of an outlet duct connecting the flue gas desulfurization system and the discharge stack with a manifold that connects the flue gas desulfurization system, an excess air duct and the discharge stack.

In one embodiment, the steam generator system further includes a flue gas reheat air particulate removal system, and the air preheater is in communication with the discharge stack through the flue gas reheat air particulate removal system. The retrofit method includes removing particulate contaminants from the second portion of air, the particulate contaminants being introduced to the second portion of air from leakage within the air preheater from the flue gas mixture.

In one embodiment, the steam generator system further includes a humidity sensor disposed in the communication between the steam generator vessel and the air preheater and the retrofit method includes measuring, with the humidity sensor, humidity of the flue gas mixture to determine a magnitude of first temperature.

In one embodiment, the steam generator system further includes an infrared sensor and the retrofit method includes determining, with the infrared sensor, the cold end metal temperature in the air preheater, comparing the cold end metal temperature to the water dew point temperature; and controlling the cold end metal temperature to be no less than the water dew point temperature.

In one embodiment, in the retrofit method a second thermal efficiency of the steam generator system, after implementing the retrofit method, is at least as great as a first thermal efficiency of the steam generator system before implementing the retrofit method.

There is further disclosed herein a method for improving effectiveness of a steam generator system. The method includes providing a steam generator system that includes a steam generator vessel, an air supply system, an air preheater, a first particulate removal system, a second particulate removal system, a flue gas desulfurization system, and a flue gas discharge stack. The air supply system is in communication with the steam generator vessel through the air preheater and the steam generator vessel is in communication with the discharge stack through the air preheater, the first particulate removal system and the flue gas desulfurization system. The first particulate removal system is located downstream of the air preheater and the flue gas desulfurization system is located downstream of the first particulate removal system. The discharge stack is located downstream of the flue gas desulfurization system and the air preheater is in communication with the discharge stack through the second particulate removal system. The method also includes providing a humidity sensor disposed between the steam generator vessel and the air preheater; and providing an infrared sensor in the air preheater. The method includes humidity of a flue gas mixture with the humidity sensor to determine a magnitude of a first temperature. The air supply system provides a first amount of air to the air preheater. The first amount of air is of a magnitude in excess of that required for combustion of fuel in the steam generator vessel. The air preheater provides the first amount of air at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The method includes determining, with the infrared sensor, the cold end metal temperature in the air preheater, comparing the cold end metal temperature to the water dew point temperature; and controlling the cold end metal temperature to be no less than the water dew point temperature. The method includes mitigating $SO_3$ in the flue gas mixture generated in the steam generator vessel. The mitigating of $SO_3$ occurs before the flue gas mixture enters the air preheater. The method includes configuring the air preheater to heat the first amount of air to a second temperature of about 288° C. to 399° C. (550° F. to 750° F.) and supplying a first portion of the first amount of air as combustion air to the steam generator vessel for combustion of the fuel. The method includes discharging the flue gas mixture at the first temperature, directly from the air preheater to the particulate removal system, thereby removing particulate from the flue gas mixture and creating a first treated flue gas mixture. The method includes discharging the first treated flue gas mixture from the particulate removal system directly into the flue gas desulfurization system thereby creating in and discharging from the flue gas desulfurization system, a second treated flue gas mixture at a third temperature of 52° C. to 60° C. (125° F. to 140° F.). The method includes removing particulate contaminants from the second portion of air. The particulate contaminants are introduced to the second portion of air from leakage within the air preheater from the flue gas mixture. The method further includes injecting a second portion of the first amount of air as flue gas reheat air fed from the air preheater at the second temperature with the second flue treated flue gas mixture at the third temperature, thereby creating third treated flue gas mixture at a fourth temperature of at least 68° C. (155° F.), prior to entering the discharge stack. The method also includes admitting the third treated flue gas mixture to the discharge stack at the fourth temperature.

BRIEF DESCRIPTION OF THE DRAWINGS

FIG. 5 is a graph of reheat air ratio to scrubbed gas for various flue gas temperature increases; and FIG. 6 is a graph of air preheater efficiency improvements.

DETAILED DESCRIPTION

Figure 1:
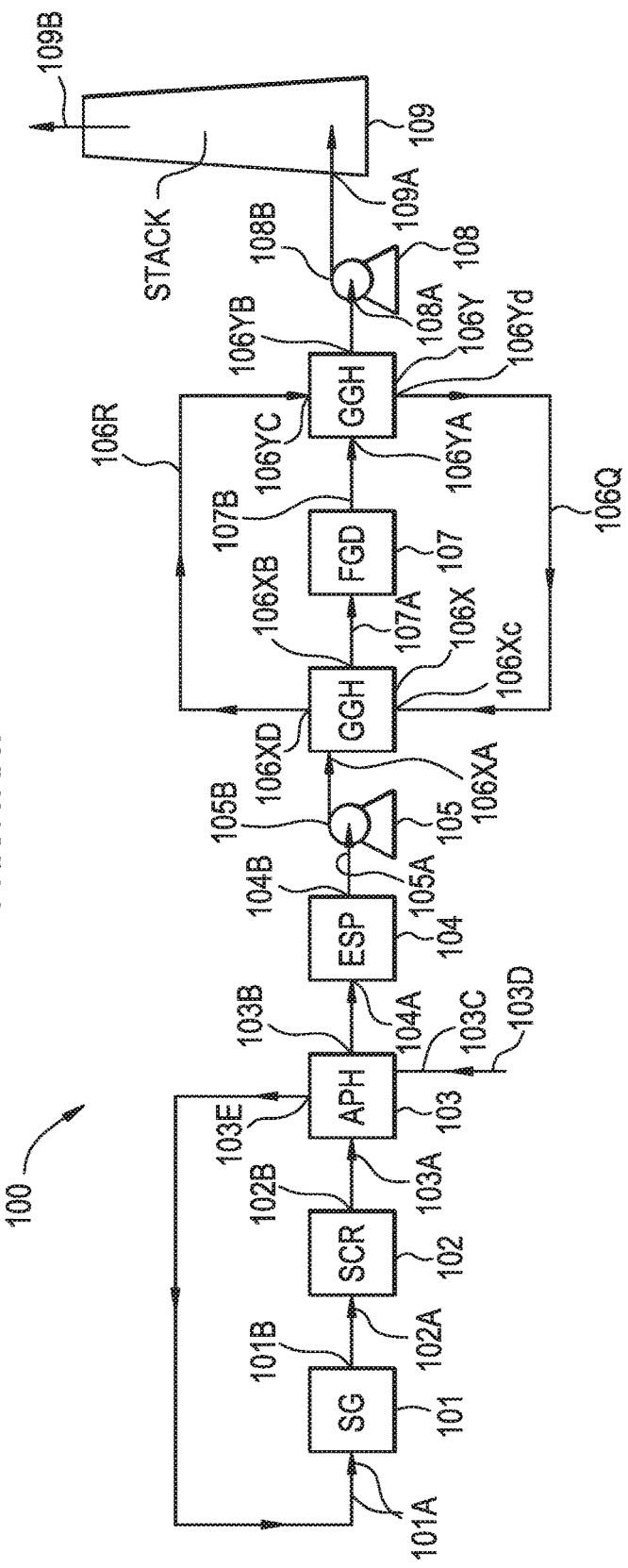
FIG. 1 is a schematic flow diagram of a prior art steam generator system.
Figure 2:
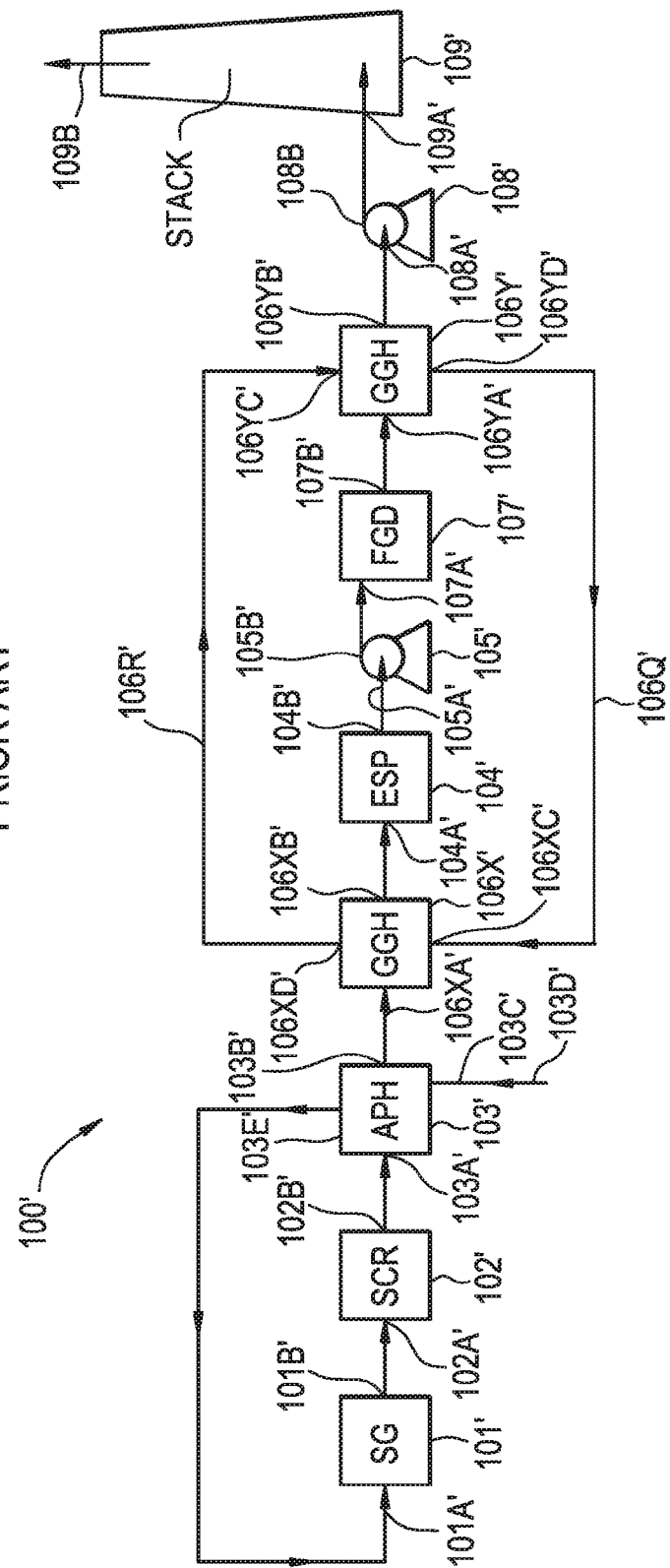
FIG. 2 is a schematic flow diagram of another prior art steam generator system.
Figure 3:
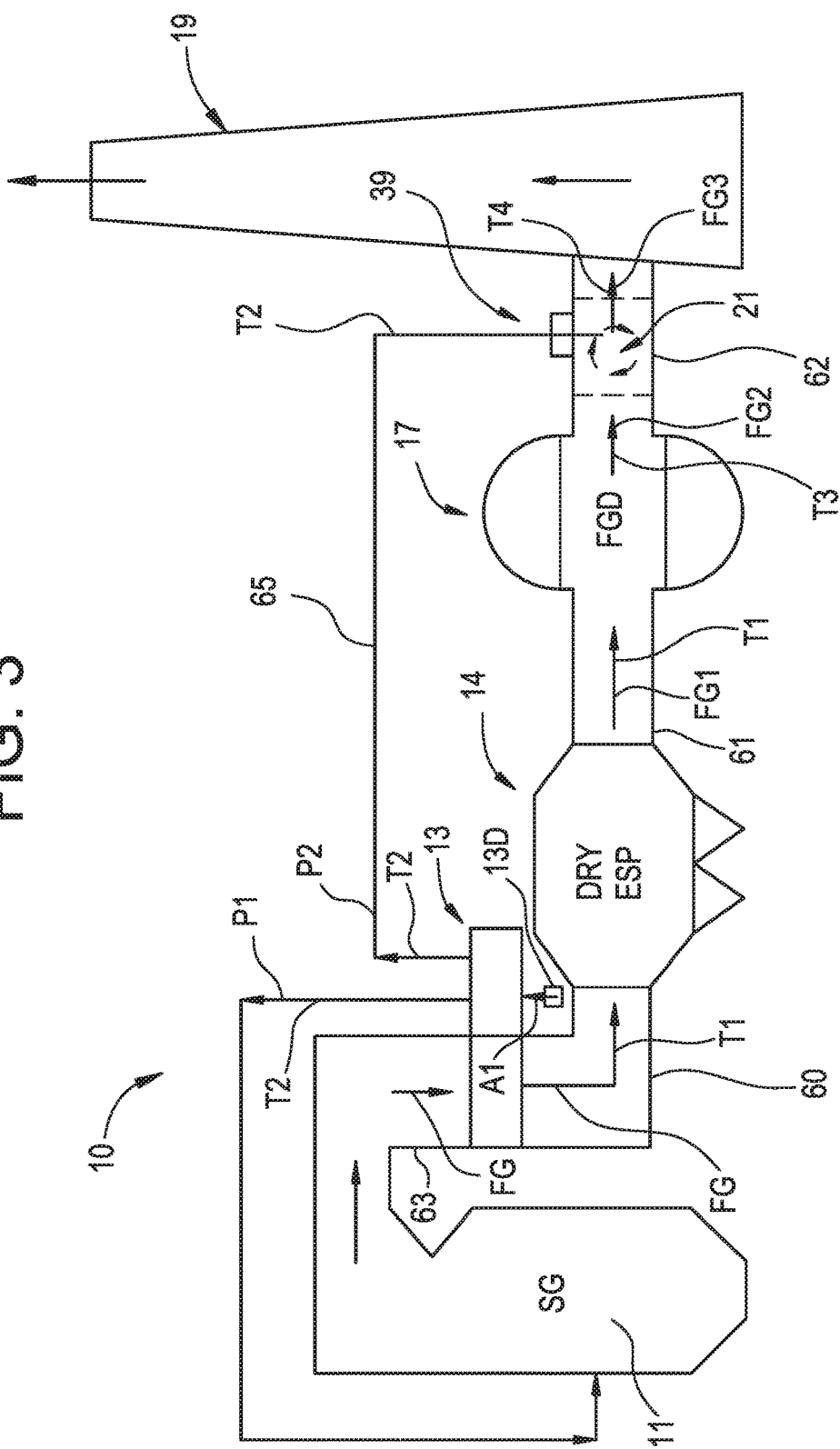
FIG. 3 is a schematic flow diagram of a steam generator system of the present invention.

As shown in FIG. 3, a system for improving effectiveness of a steam generator system is generally designated by the numeral 10. The steam generator system 10 includes a steam generator vessel 11 and an air preheater 13 (e.g., a rotary regenerative heat exchanger). The air preheater 13 is in communication with the steam generator vessel 11 via a duct 63. The steam generator system 10 includes an air supply system 13D configured to provide air to the steam generator 11 through the air preheater 13. The steam generator system 10 also includes a particulate removal system 14, a flue gas desulfurization system 17 and a discharge stack 19 in the configuration illustrated in FIG. 3. As used herein the term "improving the effectiveness of a steam generator system" includes: 1) maintaining the overall thermal efficiency of the steam generator system 10 while eliminating heat exchangers between the air preheater 13 and the discharge stack 19; 2) reducing fouling in the air preheater 13; 3) improving the efficiency of the particle removal system 14; 4) improving the efficiency of the air preheater 13 and/or 5) improving the overall thermal efficiency of the steam generator system 10 compared to prior art steam generator systems (e.g., the steam generator systems 100 and 100' of FIGS. 1 and 2). Though significant analysis and testing and many years of unsuccessful attempts, the inventors have surprisingly discovered a steam generator system 10, 10' that can operate at least as thermally efficiently as the prior art steam generator systems 100, 100 but without the efficiency enhancing benefit of the GGHs 106X, 106X', 106Y and 106Y' as shown in FIGS. 1 and 2.

As shown in FIG. 3, the steam generator vessel 11 is in communication with the discharge stack 19 through the air preheater 13; the particulate removal system 14 and the flue gas desulfurization system 17. The particulate removal system 14 is located directly downstream of the air preheater 13, such that there are no other substantive components such as fans or heat exchangers located between the air preheater 13 and the particulate removal system 14 which are in fluid communication with one another via a duct 60. In particular, there is no GGH 106X', similar to that shown in FIG. 2, located between the air preheater 13 and the particulate removal system 14. The flue gas desulfurization system 17 is located directly downstream of the particulate removal system 14, such that there are no other substantive components, such as heat exchangers, located between the particulate removal system 14 and the flue gas desulfurization system 17 which are in fluid communication with one another via a duct 61. In particular, there is no GGH 106X, similar to that shown in FIG. 1, located between the particulate removal system 14 and the flue gas desulfurization system 17. The discharge stack 19 is located directly downstream of the flue gas desulfurization system 17, such that there are no other substantive components such as fans or heat exchangers located between the flue gas desulfurization system 17 and the discharge stack 19 which are in fluid communication with one another via a duct 62. In particular, there is no GGH 106Y or 106Y', similar to that shown in FIGS. 1 and 2, located between the flue gas desulfurization system 17 and the discharge stack 19. There are no heat exchangers located between the air preheater 13 and the discharge stack 19. In one embodiment, the duct 62 includes a reheat air injection device 21, such as a mixer, one or more turning vanes, a juncture and/or a tabulator device disposed therein for mixing of a second portion P2 of the first amount A1 of air with a second treated flue gas mixture FG2, as described herein.

As illustrated in FIG. 3, the air supply system 13D is configured to provide a first amount A1 of air to the air preheater 13. The first amount A1 of air is of a magnitude in excess of that required for combustion of fuel in the steam generator vessel 11. The air preheater 13 is configured to provide the first amount A1 of air at a mass flow sufficient to establish a first temperature T1 of a flue gas mixture FG exiting the air preheater 13. The first temperature T1 is such that the air preheater 13 has a cold end metal temperature that is no less than a water dew point temperature in the air preheater 13 and such that the cold end metal temperature is less than a sulfuric acid dew point temperature. The term "cold end metal" as used herein is the portion of the air preheater 13 that is at the lowest temperature in therein. The first temperature T1 is from about 105° C. (220° F.) to about 125° C. (257° F.).

The air preheater 13 is also configured to heat the first amount of air A1 to a second temperature T2 of about 288° C. to 399° C. (550° F. to 750° F.) for use in combustion of the fuel and for reheat air as described herein.

The steam generator system 10 includes one or more systems or devices for $SO_3$ mitigation upstream of the air preheater 13 which are configured to mitigate $SO_3$ in the flue gas mixture FG generated in the steam generator vessel 11. In one embodiment, one or more systems or devices for $SO_3$ mitigation upstream of the air preheater 13 includes supplying a low sulfur fuel to the steam generator vessel 11. The low sulfur fuel has a composition suitable for generating less than 5 parts per million $SO_3$. In one embodiment, the one or more systems or devices for $SO_3$ mitigation upstream of the air preheater 13 includes removing $SO_3$ in the flue gas mixture FG prior to admitting the flue gas mixture FG to the air preheater 13, for example in the duct 63. In one embodiment, the one or more systems or devices for $SO_3$ mitigation upstream of the air preheater 13 includes chemically rendering the $SO_3$ in the flue gas mixture into an inert salt, prior to admitting the flue gas mixture FG to the air preheater 13. In one embodiment, the chemically rendering includes spraying an aqueous suspension of a reagent containing sodium, magnesium, potassium, ammonium and/or calcium thiosulfate and containing one or more soluble salt compounds such as thiosulfate and chloride species to create a particulate mist containing dry particles of at least one soluble salt compound that can react with the $SO_3$ in the flue gas.

As shown in FIG. 3, the particulate removal system 14 is configured to convey the flue gas mixture FG2 at a third temperature T3 of 52° C. to 60° C. (125° F. to 140° F.) directly to the flue gas desulfurization system 17, via the duct 61. In one embodiment, the particulate removal system 14 is a dry Electro Static Precipitator (ESP). Such a dry ESP includes rows of thin vertical wires (not shown) followed by a stack of large flat metal plates (not shown) oriented vertically. The flue gas FG flows horizontally through spaces between the wires, and then passes through the stack of plates. A negative voltage of several thousand volts is applied between wires and plates. If the applied voltage is high enough, an electric corona discharge ionizes the flue gas around the electrodes, which then ionizes the particles in the flue gas stream. The ionized particles, due to the electrostatic force, are diverted towards the grounded plates. Particles build up on the collection plates and are removed therefrom.

Figure 4:
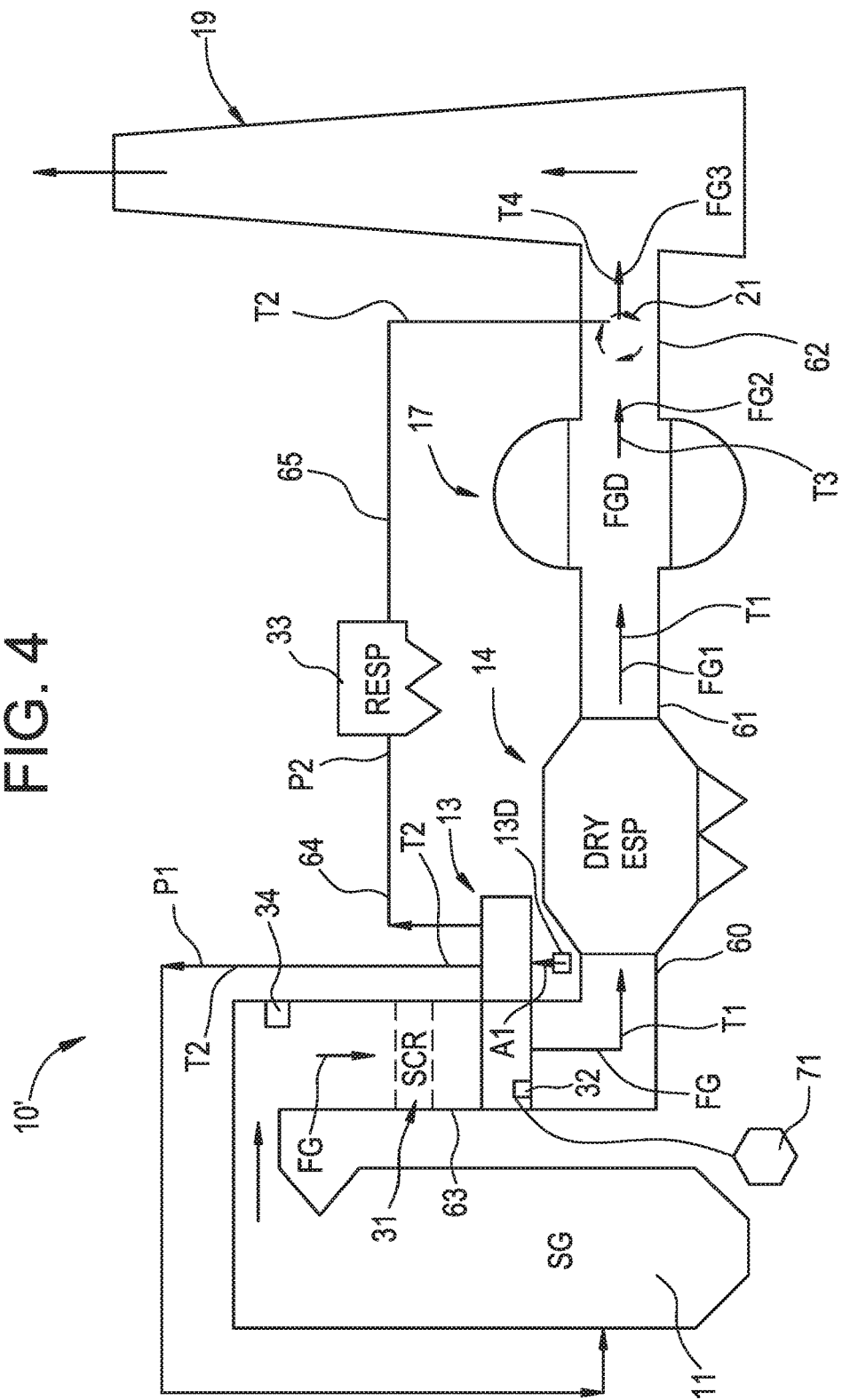
FIG. 4 is a schematic flow diagram if another embodiment of the steam generator system of the present invention.

As shown in FIG. 4, in one embodiment, the steam generator system 10' further comprises a flue gas reheat air particulate removal system 33 positioned in and between ducts 64 and 65. The air preheater 13 is in communication with the discharge stack 19 through the flue gas reheat air particulate removal system 33 to operatively remove, from the second portion P2 of air, particulate contaminants introduced from leakage within the air preheater 13 from the flue gas mixture FG. In one embodiment, the flue gas reheat air particulate removal system 33 is configured similar to the particulate removal system 14 as described herein. As illustrated in FIG. 4, there are no fans disposed between the flue gas reheat air particulate removal system 33 and the discharge stack 19.

As shown in FIG. 3, an excess air duct 65 is in communication with the air preheater 13 and the duct 62 positioned between the flue gas desulfurization system 17 and the discharge stack 19. The excess air duct 65 is configured to convey a second portion P2 of the first amount A1 of air as flue gas reheat air P2 fed from the air preheater 13 at the second temperature T2 from the air preheater 13 to the second duct 62. For example, the excess air duct 65 is covered with a thermal insulation (not shown) in order to minimize heat loss from the excess air duct 65. In addition, the excess air duct 65 is configured with a suitable cross sectional flow area, smooth internal surfaces and a minimal number of bends to minimize pressure loss through the excess air duct 65.

As shown in FIG. 3, a reheat air injection device 21 is located between the flue gas desulfurization system 17 and the discharge stack 19. The reheat air injection device 21 is configured to discharge the flue gas into the discharge stack 19 at a fourth temperature T4 of at least 68° C. (155° F.). In one embodiment, the reheat air injection device 21 includes a mixer, one or more turning vanes, a juncture and/or a tabulator device disposed therein for mixing of the second portion P2 (i.e., the flue gas reheat air P2) of the first amount A1 of air with the second treated flue gas mixture FG2. In one embodiment, the reheat air injection device is part of a manifold 39 that connects the flue gas desulfurization system 17 the excess air duct 65 and the discharge stack 19. The manifold includes a branch connection to which the excess air duct 65 is connected.

As shown in FIG. 4, in one embodiment, the steam generator system 10' includes a selective catalytic reduction system (SCR) 31 for converting nitrogen oxides, also referred to as $NO_X$ with the aid of a catalyst into diatomic nitrogen ($N_2$) and water ($H_2O$). The steam generator vessel 11 is in communication with the air preheater 13 through the SCR 31.

As shown in FIG. 4, in one embodiment, the steam generator system 10' includes a humidity sensor 34 disposed in an outlet of the steam generator vessel 11 and upstream of the air preheater 13 to measure humidity of the flue gas mixture FG1. The humidity sensor is configured to determine the magnitude of first temperature T1.

As shown in FIG. 4, in one embodiment, the steam generator system 10' includes an infrared sensor 32 to determine the air preheater temperature. The infrared sensor 32 is configured to determine the air preheater temperature for example, the cold end metal temperature, by measuring the temperature of a portion of the air preheater 13 that is in thermal communication with or proximate to the cold end. The steam generator system 10' includes a control unit 71, such as a computer processor, memory and signal processing electronics configured to control the cold end metal temperature above the water dew point in the air preheater 13.

The present invention includes a method for improving effectiveness of a steam generator system 10. The method includes providing a steam generator system 10 as described in detail herein and including the steam generator vessel 11, the air supply system 13D, the air preheater 13, the particulate removal system 14, the flue gas desulfurization system 17, and the flue gas discharge stack 19 The air supply system 13D is in communication with the steam generator vessel 11 through the air preheater 13, and with the steam generator vessel 11 being in communication with the discharge stack 19 through the air preheater 13, the particulate removal system 14 and the flue gas desulfurization system 17. The particulate removal system 14 is located downstream of the air preheater 13. The flue gas desulfurization system 17 is located downstream of the particulate removal system 14. The discharge stack 19 is located downstream of the flue gas desulfurization system 17.

The method includes having the air supply system 13D provide the first amount A1 of air to the air preheater 13. The first amount A1 of air is of a magnitude in excess of that required for combustion of fuel in the steam generator vessel 11. The air preheater 13 provides the first amount A1 of air at a mass flow sufficient to establish a first temperature T1 of a flue gas mixture FG exiting the air preheater 13. The first temperature T1 is such that the air preheater has a cold end metal temperature that is no less than a water dew point temperature in the air preheater 13 and such that the cold end metal temperature is less than a sulfuric acid dew point temperature. The first temperature T1 being from about 105° C. (220° F.) to about 125° C. (257° F.).

The method includes mitigating $SO_3$ in the flue gas mixture FG generated in the steam generator vessel 11, before the flue gas mixture FG enters the air preheater 13. The method includes configuring the air preheater 13 to heat the first amount of air A1 to a second temperature T2 of about 288° C. to 399° C. (550° F. to 750° F.) and supplying a first portion P1 of the first amount A1 of air as combustion air to the steam generator vessel 11 for combustion of the fuel. The method includes discharging the flue gas mixture FG at the first temperature T1, directly from the air preheater 13 to the particulate removal system 14 thereby removing particulate from the flue gas mixture FG and creating a first treated flue gas mixture FG1. The method further includes discharging the first treated flue gas mixture FG1 from the particulate removal system 14 directly into the flue gas desulfurization system 17 thereby creating in and discharging from the flue gas desulfurization system 17, a second treated flue gas mixture FG2 at a third temperature T3 of 52° C. to 60° C. 125° F. to 140° F. The method also includes injecting a second portion P2 of the first amount A1 of air as flue gas reheat air fed from the air preheater 13 at the second temperature T2 with the second flue treated flue gas mixture FG2 at the third temperature T3 thereby creating third treated flue gas mixture FG3 at a fourth temperature T4 of at least 68° C. 155° F., prior to entering the discharge stack 19. The third treated flue gas mixture FG3 is admitted to the discharge stack 19 at the fourth temperature T4.

In one embodiment, the steam generator system 10 further includes an SCR 31 as shown in FIG. 4 for 31 for converting nitrogen oxides, also referred to as $NO_X$ with the aid of a catalyst into diatomic nitrogen ($N_2$) and water ($H_2O$). The steam generator vessel 11 is in communication with the air preheater 13 through the SCR 31.

As shown in FIG. 4, in one embodiment, the steam generator system 10' includes a flue gas reheat air particulate removal system 33. The air preheater 13 is in communication with the discharge stack 19 through the flue gas reheat air particulate removal system 33. In one embodiment, the method includes removing particulate contaminants from the second portion P2 of air. The particulate contaminants are introduced to the second portion P2 of air from leakage within the air preheater 13 from the flue gas mixture FG1.

As shown in FIG. 4, in one embodiment, the steam generator system 10' includes a humidity sensor 34 disposed between the steam generator vessel 11 and the air preheater 13. In one embodiment, the method includes measuring, with the humidity sensor 34, humidity of the flue gas mixture FG1 to determine a magnitude of first temperature T1.

As shown in FIG. 4, in one embodiment, the steam generator system 10' includes an infrared sensor 32. In one embodiment, the method includes determining, with the infrared sensor, the cold end metal temperature in the air preheater 13. The infrared sensor 32 is determines the air preheater temperature for example, the cold end metal temperature, by measuring the temperature of a portion of the air preheater 13 that is in thermal communication with or proximate to the cold end. The steam generator system 10' includes a control unit 71, such as a computer processor, memory and signal processing electronics and the method includes comparing the cold end metal temperature to the water dew point temperature and controlling, with the control unit, the cold end metal temperature above the water dew point in the air preheater 13.

In one embodiment, the method includes mitigating $SO_3$ in the flue gas mixture FG by supplying a low sulfur fuel to the steam generator vessel 11. The low sulfur fuel being of a composition to generate less than 5 parts per million $SO_3$.

In one embodiment, the method includes mitigating $SO_3$ in the flue gas mixture FG by removing $SO_3$ in the flue gas mixture FG prior to admitting the flue gas mixture FG to the air preheater 13.

In one embodiment, the method includes mitigating $SO_3$ in the flue gas mixture FG by chemically rendering the $SO_3$ in the flue gas mixture into an inert salt, prior to admitting the flue gas mixture FG to the air preheater 13. In on embodiment, the chemically rendering step includes spraying an aqueous suspension of a reagent containing at least one of sodium, magnesium, potassium, ammonium and calcium thiosulfate and containing at least one soluble salt compound chosen from the group consisting of thiosulfate and chloride species to create a particulate mist containing dry particles of at least one soluble salt compound that can react with the $SO_3$ in the flue gas.

In one embodiment, the method includes providing an injection device 21 between the flue gas desulfurization system 17 and the discharge stack 19 and wherein the injecting of the second portion P2 of the first amount A1 of air, at the second temperature T2, with the second flue treated flue gas mixture FG2 at the third temperature T3 occurs in the injection means.

In one embodiment, the method includes the discharging the flue gas mixture FG at the first temperature T1, directly from the air preheater to the particulate removal system 14 with no heat exchangers disposed between the air preheater 13 and the particulate removal system 14.

In one embodiment, the method includes discharging the first treated flue gas mixture FG1 from the particulate removal system 14 directly into the flue gas desulfurization system 17, with no heat exchangers disposed between the particulate removal system 14 and the flue gas desulfurization system 17.

In one embodiment, the method includes injection of the second portion P2 of the first amount A1 of air at a mass ratio of the second portion P2 to the second treated flue gas mixture FG3 of 1 percent to 16 percent. In one embodiment, the method includes injection of the second portion P2 of the first amount A1 of air at a mass ratio of the second portion P2 to the second treated flue gas mixture FG3 of 9 percent to 16 percent.

The present invention includes a method for retrofitting a steam generator system 100, 100' for improved effectiveness. The method for retrofitting includes removing one or more heat exchangers positioned downstream of the air preheater 13. The method for retrofitting includes reconfiguring an air supply source 13D to the air preheater 13 to supply a first amount A1 of air in excess of that required for combustion of fuel in the steam generator vessel 11 and reconfiguring at least one of the air supply source 13D and the air preheater 13 the air preheater 13 such that the first amount A1 of air is provided at a mass flow sufficient to establish a first temperature T1 of a flue gas mixture FG exiting the air preheater 13, the first temperature T1 being such that the air preheater has a cold end metal temperature that is no less than a water dew point temperature in the air preheater 13 and such that the cold end metal temperature is less than a sulfuric acid dew point temperature, and the first temperature T1 being from about 105° C. (220° F.) to about 125° C. (257° F.). The reconfiguring of the air supply 13D includes but is not limited to employing a higher flow and/or pressure capacity fan or blower and/or reducing the pressure drop in the air supply system, compared to that employed in the prior art air supply 103D, 103 D' as shown in FIGS. 1' and 2, respectively.

The method for retrofitting includes providing one or more $SO_3$ mitigation systems in communication with the steam generator vessel 11. The $SO_3$ mitigation systems are configured to mitigate the $SO_3$ in the flue gas mixture generated in the steam generator vessel 11. In one embodiment, the mitigating of $SO_3$ occurs before the flue gas mixture FG enters the air preheater 13. The method for retrofitting includes configuring the air preheater 13 to heat the first amount of air A1 to a second temperature T2. The second temperature is substantially no less than the temperature of combustion air of an original system (e.g., a prior art steam generator system 100, 100' of FIGS. 1 and 2, respectively). In one embodiment, the second temperature is about of 288° C. to 399° C. (550° F. to 750° F.) to maintain or improve boiler thermal efficiency. The method for retrofitting includes supplying a first portion P1 of the first amount A1 of air to the steam generator vessel 11 for combustion of the fuel. The method for retrofitting includes discharging the flue gas mixture FG at the first temperature T1, directly from the air preheater 13 to the particulate collection system 14 thereby removing particulate from the flue gas mixture FG and creating a first treated flue gas mixture FG1. The first treated flue gas mixture FG1 is discharged from the particulate removal system 14 directly into the flue gas desulfurization system 17 (i.e., without flowing through a heat exchanger such as the GGH 106Y, 106Y' of the prior art heat exchanger systems of FIGS. 1 and 2, respectively). The method for retrofitting includes creating in and discharging from the flue gas desulfurization system 17, a second treated flue gas mixture FG2 at a third temperature T3 of 52° C. to 60° C. (125° F. to 140° F.).

The method for retrofitting includes injecting a second portion P2 of the first amount A1 of air as flue gas reheat air fed from the air preheater 13 at the second temperature T2 with the second flue treated flue gas mixture FG2 at the third temperature T3 thereby creating third treated flue gas mixture FG3 at a fourth temperature T4 of 68° C. (155° F.), prior to entering the discharge stack 19; and admitting the third treated flue gas mixture FG3 to the discharge stack 19 at the fourth temperature T4.

In one embodiment, the method for retrofitting includes replacing at least a portion of an outlet duct connecting the flue gas desulfurization system 17 and the discharge stack 19 with a manifold 39 that connects the flue gas desulfurization system 17, an excess air duct 65 and the discharge stack 19.

In one embodiment, the method for retrofitting includes providing a flue gas reheat air particulate removal system 33, such that the air preheater 13 is in communication with the discharge stack 19 through the flue gas reheat air particulate removal system 33. Particulate contaminants are removed from the second portion P2 of air, the particulate contaminants being introduced to the second portion P2 of air from leakage within the air preheater 13 from the flue gas mixture FG1.

In one embodiment, the method for retrofitting includes a humidity sensor 34 disposed in the communication between the steam generator vessel 11 and the air preheater 13. The humidity sensor 34 measures the humidity of the flue gas mixture FG1 to determine a magnitude of first temperature T1.

In one embodiment, the method for retrofitting includes providing an infrared sensor 32; and determining, with the infrared sensor, the cold end metal temperature in the air preheater 13, comparing the cold end metal temperature to the water dew point temperature; and controlling the cold end metal temperature to be no less than the water dew point temperature, with the control unit 71 as described herein.

After implementing the retrofit method, the steam generator system 10, 10' has a second thermal efficiency that is least as great as a first thermal efficiency of the prior art steam generator system (e.g., the steam generator system 100, 100' of FIGS. 1 and 2, respectively) before implementing the retrofit method.

The present invention also includes another method for improving effectiveness of a steam generator system 10. The method includes providing a steam generator system 10 that includes the steam generator vessel 11, the air supply system 13D, the air preheater 13, the first particulate removal system 14, the second particulate removal system 33, the flue gas desulfurization system 17, and the flue gas discharge stack 19. The steam generator system 10 has the air supply system 13D in communication with the steam generator vessel 11 through the air preheater 13. The steam generator vessel 11 is in communication with the discharge stack 19 through the air preheater 13, the first particulate removal system 14 and the flue gas desulfurization system 17, with the first particulate removal system 14 being located downstream of the air preheater 13, with the flue gas desulfurization system 17 being located downstream of the first particulate removal system 14; with the discharge stack 19 being located downstream of the flue gas desulfurization system 17 and with the air preheater 13 being in communication with the discharge stack 19 through the second particulate removal system 33. The method includes providing a humidity sensor 34 disposed between the steam generator vessel 11 and the air preheater 13 providing an infrared sensor 32 proximate or in the air preheater 13. The method includes measuring humidity of a flue gas mixture FG1 with the humidity sensor to determine a magnitude of a first temperature T1.

The method includes providing, via the air supply system 13D, a first amount A1 of air to the air preheater 13, the first amount A1 of air being of a magnitude in excess of that required for combustion of fuel in the steam generator vessel 11 and the air preheater 13 providing the first amount A1 of air at a mass flow sufficient to establish a first temperature T1 of a flue gas mixture FG exiting the air preheater 13, the first temperature T1 being such that the air preheater has a cold end metal temperature that is no less than a water dew point temperature in the air preheater 13 and such that the cold end metal temperature is less than a sulfuric acid dew point temperature and the first temperature T1 being from about 105° C. (220° F.) to about 125° C. (257° F.).

The method includes determining, with the infrared sensor 32, the cold end metal temperature in the air preheater 13, comparing the cold end metal temperature to the water dew point temperature; and controlling the cold end metal temperature to be no less than the water dew point temperature, using the control unit 71, as described herein.

The method includes mitigating $SO_3$ in the flue gas mixture generated in the steam generator vessel 11. The mitigating of $SO_3$ occurs before the flue gas mixture FG enters the air preheater 13. The air preheater 13 is configured to heat the first amount of air A1 to a second temperature T2 of about 288° C. to 399° C. (550° F. to 750° F.). A first portion P1 of the first amount A1 of air is supplied as combustion air to the steam generator vessel 11 for combustion of the fuel.

The method includes discharging the flue gas mixture FG at the first temperature T1, directly from the air preheater 13 to the particulate removal system 14 thereby removing particulate from the flue gas mixture FG and creating a first treated flue gas mixture FG1. The first treated flue gas mixture FG1 is discharged from the particulate removal system 14 directly into the flue gas desulfurization system 17 thereby creating in and discharging from the flue gas desulfurization system 17, a second treated flue gas mixture FG2 at a third temperature T3 of 52° C. to 60° C. (125° F. to 140° F.).

The method includes removing particulate contaminants from the second portion P2 of air. The particulate contaminants being introduced to the second portion P2 of air from leakage within the air preheater 13 from the flue gas mixture FG1. A second portion P2 of the first amount A1 of air is injected as flue gas reheat air fed from the air preheater 13 at the second temperature T2 with the second flue treated flue gas mixture FG2 at the third temperature T3 thereby creating third treated flue gas mixture FG3 at a fourth temperature T4 of at least 68° C. (155° F.), prior to entering the discharge stack 19. The third treated flue gas mixture FG3 is admitted to the discharge stack 19 at the fourth temperature T4.

As shown in FIG. 5, a graph generally designated by the numeral 70 has the flue gas reheat air P2 temperature in degrees Fahrenheit designated on an X-axis 72 and reheat air ratio RR in percentage equal to the mass flow rate $W_R$ of flue gas reheat air P2 (i.e., the second portion P2 of the first amount A1 of air) divided by 100 times the mass flow rate WG of scrubbed gas FG2 leaving the FGD system 17 (FIGS. 3 and 4) at 125° F., on a Y-axis 71. The graph 70 includes plots for six different increases in temperature DTr of the flue gas FG2 exiting the FGD 17 (FIGS. 3 and 4). Specifically, the graph includes a plot 80 for DTr of 5° F., a plot 81 for DTr of 10° F., a plot 82 for DTr of 20° F., a plot 83 for DTr of 30° F.; a plot 84 for DTr of 40° F. and a plot 85 for DTr of 50° F., illustrating the reheat air ratio RR as a function of temperature of the reheat air P2. For example, reheat ratio RR ranges from about 1 percent at point 86 (i.e., 800° F., 0.9% for the DTr of 5° F. of the plot 85) to about 16 percent at point 87 (i.e., 500° F., 15.9% at 500° F. for the DTr of 50° F. of the plot 85). For the plot 85 for the 50° F. DTr, the RR ranges from about 9 percent at point 88 (i.e., 800° F., 9.1% for the DTr of 50° F. of the plot 85) to about 16 percent at point 87 (i.e., 500° F., 15.9% at 500° F. for the DTr of 50° F. of the plot 85). While the ranges of reheat ratio RR of 1 percent to 16 percent and 9 percent to 16 percent are shown and described, other ranges of the reheat ratio RR may be employed, depending on the DTr and the temperature of the reheat air P2. The inventors arrived at the data points and plots 80-85 of FIG. 5 as a result of significant analysis and testing, thereby discovering the surprising results graphically illustrated on the graph 70 of FIG. 5.

As shown in FIG. 6, a graph 90 has air preheater 13 effectiveness 92 in percentage is shown on an X-axis 92 and temperature in degrees Celsius is shown on a Y-axis 91 for a 1000 MW steam generator system 10, 10' with a 28° C. (50° F.) temperature rise of the flue gas FG2 exiting the FGD 17 as a result of the injection of the flue gas reheat air P2 into the duct 62 between the FGD 17 and the discharge stack 19. The graph 90 includes a plot 93 of air preheater 13 effectiveness in terms of secondary air P1, P2 temperature T2 (FIGS. 3 and 4). The graph 90 includes a plot 94 of air preheater 13 effectiveness in terms of flue gas FG outlet temperature T1 (FIGS. 3 and 4). The inventors have discovered that to maintain the thermal efficiency of the steam generator system 10, 10' a differential temperature DT of 35° C. between the 150° C. flue gas FG outlet temperature of the prior art steam generator system 100, 100' (illustrated by dotted line 98" in the graph 90) and the flue gas FG outlet temperature T1 (FIGS. 3 and 4) of about 105 C (illustrated by dotted line 98' in the graph 90) is required. As the differential temperature DT of the flue gas outlet temperature increases, thermal efficiency improvements of the steam generator system 10, 10' are realized. For example, as shown in the graph 90, a thermal efficiency increase is realized at point 94A of the line 94 at which the flue gas outlet temperature T1 is 90° C. and the air preheater effectiveness is 97 percent. The increased thermal efficiency and air preheater effectiveness is a result of the first amount of air A1 being greater than that supplied through prior art air preheaters and/or increased efficiency or increased area of heat transfer elements in the air preheater 13 compared to the heat transfer elements employed in prior art air preheaters. As shown in the graph 90 effectiveness of the air preheater 13 and increased thermal efficiency of the steam generator system 10, 10', compared to prior art steam generator systems 100, 100', is also realized through an increase in the temperature of the first portion P1 of the first amount A1 of air supplied to the steam generator vessel 11 for combustion of the fuel. The Graph 90 includes a plot 93 illustrating an increase in effectiveness of the air preheater 13 as a function of temperature of the first portion P1 of the first amount A1. For example, at point 93A in which the temperature of the first portion P1 of the first amount A1 is 368° C. and the air preheater 13 effectiveness is at 97 percent, an increase in thermal efficiency of the steam generator system 10, 10' is realized, compared to the prior art steam generator systems 100, 100'.

The inventors have surprisingly discovered through ten years of experimentation, analysis and testing a combination of optimum temperature ranges and system configurations for operation of the steam generator system 10 of the present invention that improves the thermal efficiency of the steam generator system compared to prior art steam generator systems such as 100 and 100' while reducing the potential for fouling and visible stack plume.

For example, those skilled in the art have tried and have been unsuccessful in being able to increase air flow through the preheater 13 to achieve a magnitude in excess of that required for combustion of fuel in the steam generator vessel 11 and while being sufficient to establish the first temperature T1 of the flue gas mixture FG exiting the air preheater 13 105° C. 220° F. or less, while in the same system employing all of the following specific design features: 1) mitigating $SO_3$ in the flue gas mixture generated in the steam generator vessel 11, the mitigating of $SO_3$ occurring before the flue gas mixture FG enters the air preheater 13; 2) configuring the air preheater 13 to heat the first amount of air A1 to a second temperature T2 of 288° C. to 399° C. 550° F. to 750° F.; 3) supplying a first portion P1 of the first amount A1 of air to the steam generator vessel 11 for combustion of the fuel; 4) discharging the flue gas mixture FG at the first temperature T1, directly from the air preheater 13 to the particulate collection system 14 thereby removing particulate from the flue gas mixture FG and creating a first treated flue gas mixture FG1; 5) discharging the first treated flue gas mixture FG1 from the particulate removal system 14 directly into the flue gas desulfurization system 17 thereby creating in and discharging from the flue gas desulfurization system 17, a second treated flue gas mixture FG2 at a third temperature T3 of 52° C. to 60° C. 125° F. to 140° F.; 6) injecting a second portion P2 of the first amount A1 of air at the second temperature T2 with the second flue treated flue gas mixture FG2 at the third temperature T3 thereby creating third treated flue gas mixture FG3 at a fourth temperature T4 of 79° C. to 88° C. 175° F. to 190° F., prior to entering the discharge stack 19; and 7) admitting the third treated flue gas mixture FG3 to the discharge stack 19 at the fourth temperature T4. One skilled in the relevant art would understand that there are an almost infinite number of system configurations that could be tried by varying the temperature of the flue gas exiting the air preheater 13 along with the seven other design features delineated above. It is only as a result of the analysis, experimentation and testing that the inventors have overcome problems with competing design features and discovering the optimum combination as disclosed and claimed herein.

In general, the testing, experimentation and analysis included consideration of: 1) mixing efficiency of the injection of the second portion P2 of the first amount A1 of air at the second temperature T2 with the second flue treated flue gas mixture FG2; 2) fly ash concentrations at various locations in the steam generator system including the amount on the second portion P2 of air; 3) determination of the amount of the second portion P2 of air which would provide enough heat to justify removal of the GGH heat exchangers; 4) pressure drops though the steam generator system 10; 5) heat loss in the excess air duct 65; 6) the effect on fuel combustion in the steam generator vessel; 7) the effect on thermal efficiency of the steam generator system; and 8) efficiency and water supply requirements for the FGD 17.

Those skilled in the art have been discouraged from reducing the temperature of the flue gas exiting the air preheater to 105° C. (220° F.) or less because of several problems encountered. A first problem is that this level of flue gas temperature reduction (i.e., reducing the temperature of the flue gas exiting the air preheater to 105° C. (220° F.) or less) cannot normally be economically achieved without incremental air flow. There is a practical limit to the amount of heat that can be recovered from flue gas passing through a normal air preheater. This limit is established based on the maximum possible heat transfer, $q_{max}=(m*c)_{min}*(T_{gi}-T_{ai})$, wherein $T_{gi}$ is the temperature of the flue gas entering the air preheater and $T_{ai}$ is the temperature of the air entering the air preheater. The quantity $(m*c)_{min}$ is the product of the mass flow rate and specific heat of the minimum fluid, and for a normal air preheater the minimum fluid is the combustion air. As the mass flow of the air is increased, there is a direct increase in the maximum possible heat transfer. The present invention makes use of incremental air flow as part of the means for incrementally reducing flue gas temperature. In maintaining and improving steam generator efficiency however, it is also necessary to maintain or improve the amount of heat returned to the steam generator. This is accomplished by maintaining or improving the effectiveness of the air preheater, Effectiveness=Actual Heat Transfer/Maximum Possible Heat Transfer. It is the actual heat transfer to the combustion air that must be maintained or improved, and this is accomplished by a) eliminating the use of cold air steam air preheat or b) the use or more, and/or more highly effective heat transfer surface.

A second problem is that there has been no significant demand for incremental, preheated air flow at the plants. The present invention delivers a source of preheated air that can be used for stack gas reheat.

A third problem is that for many fuels, a reduction in flue gas temperature leads to significant air preheater fouling and/or corrosion. As needed based on the $SO_3$ content of the flue gas, the present invention makes use of $SO_3$ mitigation to reduce the $SO_3$ content to less than or equal to approximately 5 ppmv entering the air preheater. This has been demonstrated to prevent fouling and corrosion at reduced flue gas temperatures well below the dew point of the original flue gas.

A fourth problem is that plants without the means for adequate control of the minimum cold end element temperature have experienced severe corrosion due to the condensation of halogen acids at temperatures near the water dew point. In one embodiment, the present invention employs a flue gas humidity sensor to establish the water content of the flue gas, which may be used to calculate the water dew point. The dew points of the critical halogen acids (HCl, HF, HBr) may then be estimated using dew point correlations available in literature. The use of an infrared or other sensor may be used to determine the minimum cold end element temperature, which may be compared to the critical dew points. The avoidance of dew point condensation is achieved by a) the use of steam coils to preheat the cold incoming air or 2) the reduction in the amount of preheated air used for stack gas reheat.

Although the present invention has been disclosed and described with reference to certain embodiments thereof, it should be noted that other variations and modifications may be made, and it is intended that the following claims cover the variations and modifications within the true scope of the invention.

What is claimed is:

1. A method for improving effectiveness of a steam generator system, the method comprising:

providing a steam generator system comprising a steam generator vessel, an air supply system, an air preheater, a particulate removal system, a flue gas desulfurization system, and a flue gas discharge stack, with the air supply system being in communication with the steam generator vessel through the air preheater, and with the steam generator vessel being in communication with the discharge stack through the air preheater, the particulate removal system and the flue gas desulfurization system, with the particulate removal system being located downstream of the air preheater, with the flue gas desulfurization system being located downstream of the particulate removal system and with the discharge stack being located downstream of the flue gas desulfurization system;

the air supply system providing a first amount of air to the air preheater, the first amount of air being of a magnitude in excess of that required for combustion of fuel in the steam generator vessel and the air preheater providing the first amount of air at a mass flow sufficient to establish a first temperature of a flue gas mixture exiting the air preheater, the first temperature being such that the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.);

mitigating $SO_3$ in the flue gas mixture generated in the steam generator vessel, the mitigating of $SO_3$ occurring before the flue gas mixture enters the air preheater;

configuring the air preheater to heat the first amount of air to a second temperature of about 288° C. to 399° C. (550° F. to 750° F.);

supplying a first portion of the first amount of air as combustion air to the steam generator vessel for combustion of the fuel;

discharging the flue gas mixture at the first temperature, directly from the air preheater to the particulate removal system thereby removing particulate from the flue gas mixture and creating a first treated flue gas mixture;

discharging the first treated flue gas mixture from the particulate removal system directly into the flue gas desulfurization system thereby creating in and discharging from the flue gas desulfurization system, a second treated flue gas mixture at a third temperature; the third temperature being of a magnitude sufficient to injecting a second portion of the first amount of air as flue gas reheat air fed from the air preheater at the second temperature with the second flue treated flue gas mixture at the third temperature thereby creating third treated flue gas mixture at a fourth temperature, prior to entering the discharge stack, the third temperature being of a magnitude sufficient to allow the flue gas reheat air to raise the fourth temperature to a magnitude sufficient to mitigate visible plume exiting the discharge stack and to mitigate corrosion in the discharge stack; and admitting the third treated flue gas mixture to the discharge stack at the fourth temperature.

2. The method of claim 1, wherein the steam generator system further comprises a selective catalytic reduction system, with the steam generator vessel being in communication with the air preheater through the selective catalytic reduction system.

3. The method of claim 1, wherein the steam generator system further comprises a flue gas reheat air particulate removal system, with the air preheater being in communication with the discharge stack through the flue gas reheat air particulate removal system; and removing particulate contaminants from the second portion of air, the particulate contaminants being introduced to the second portion of air from leakage within the air preheater from the flue gas mixture.

4. The method of claim 1, wherein the steam generator system further comprises a humidity sensor disposed between the steam generator vessel and the air preheater; and measuring, with the humidity sensor, humidity of the flue gas mixture to determine a magnitude of first temperature.

5. The method of claim 1, wherein the steam generator system further comprises an infrared sensor; and determining, with the infrared sensor, the cold end metal temperature in the air preheater;

comparing the cold end metal temperature to the water dew point temperature; and controlling the cold end metal temperature to be no less than the water dew point temperature.

6. The method of claim 1, wherein the mitigating $SO_3$ in the flue gas mixture comprises supplying a low sulfur fuel to the steam generator vessel, the low sulfur fuel generating less than 5 parts per million $SO_3$.

7. The method of claim 1, wherein the mitigating $SO_3$ in the flue gas mixture comprises removing $SO_3$ in the flue gas mixture prior to admitting the flue gas mixture to the air preheater.

8. The method of claim 1, wherein the mitigating $SO_3$ in the flue gas mixture comprises chemically rendering the $SO_3$ in the flue gas mixture into an inert salt, prior to admitting the flue gas mixture to the air preheater.

9. The method of claim 8, wherein the chemically rendering comprises spraying an aqueous suspension of a reagent containing at least one of sodium, magnesium, potassium, ammonium and calcium thiosulfate and containing at least one soluble salt compound chosen from the group consisting of thiosulfate and chloride species to create a particulate mist containing dry particles of at least one soluble salt compound that can react with the $SO_3$ in the flue gas.

10. The method of claim 1, further providing injection means between the flue gas desulfurization system and the discharge stack and wherein the injecting of the second portion of the first amount of air, at the second temperature, with the second flue treated flue gas mixture at the third temperature occurs in the injection means.

11. The method of claim 10, wherein the injection means comprises a duct manifold between the flue gas desulfurization system and the discharge stack, the duct manifold comprising an inlet for receiving the second treated flue gas mixture, a branch connection for receiving the second portion of the first amount of air and an outlet in communication with the discharge stack.

12. The method of claim 10, wherein the injection means comprises at least one of a mixer, turning vanes, and/or a tabulator device.

13. The method of claim 1, wherein the particulate removal system comprises at least one of a dry electro static precipitator and a fabric filter.

14. The method of claim 1, wherein the discharging the flue gas mixture at the first temperature, directly from the air preheater to the particulate removal system, is accomplished with no heat exchangers disposed between the air preheater and the particulate removal system.

15. The method of claim 1, wherein the discharging the first treated flue gas mixture from the particulate removal system directly into the flue gas desulfurization system is accomplished with no heat exchangers disposed between the particulate removal system and the flue gas desulfurization system.

16. The method of claim 1, wherein there are no heat exchangers disposed between the air preheater and the flue gas desulfurization system.

17. The method of claim 1, wherein there are no fans disposed between the flue gas desulfurization system and the discharge stack.

18. The method of claim 1, wherein the injection of the second portion of the first amount of air is conducted at a mass ratio of the second portion to the second treated flue gas mixture of 1 percent to 16 percent.

19. The method of claim 1, wherein the injection of the second portion of the first amount of air is conducted at a mass ratio of the second portion to the second treated flue gas mixture of 9 percent to 16 percent.

20. The method of claim 1, wherein the third temperature is about 52° C. to about 60° C. (125° F. to 140° F.).

21. The method of claim 1, wherein the fourth temperature is at least 68° C. (155° F.).

22. A system for improving effectiveness of a steam generator system, the system comprising:
a steam generator vessel;
an air preheater in communication with the steam generator vessel;
an air supply system configured to provide air to the steam generator vessel through the air preheater;
a particulate removal system;
a flue gas desulfurization system;
a discharge stack;
and the steam generator vessel being in communication with the discharge stack through the air preheater, the particulate removal system and the flue gas desulfurization system, with the particulate removal system being located directly downstream of the air preheater, the flue gas desulfurization system being located directly downstream of the particulate removal system and with the discharge stack being located directly downstream of the flue gas desulfurization system;
the air supply system being configured to provide a first amount of air to the air preheater, the first amount of air being of a magnitude in excess of that required for combustion of fuel in the steam generator vessel and the air preheater being configured to provide the first amount of air at a mass flow sufficient to establish a first temperature of a flue gas mixture exiting the air preheater, the first temperature being such that the air preheater has a cold end metal temperature that is no less than a water dew point temperature in the air preheater and such that the cold end metal temperature is less than a sulfuric acid dew point temperature, and the first temperature being from about 105° C. (220° F. to about 125° C. (257° F.);
$SO_3$ mitigation means upstream of the air preheater, the $SO_3$ mitigation means being configured to mitigate $SO_3$ in the flue gas mixture generated in the steam generator vessel;
the air preheater being configured to heat the first amount of air to a second temperature of about 288° C. to 399° C. (550° F. to 750° F.;
the particulate removal system being configured to convey the flue gas mixture at a third temperature directly to the flue gas desulfurization system;
an excess air duct in communication with the air preheater and a second duct positioned between the flue gas desulfurization system and the discharge stack, the excess air duct being configured to convey a second portion of the first amount of air as flue gas reheat air fed from the air preheater at the second temperature from the air preheater to the second duct; and
injection means located between the flue gas desulfurization system and the discharge stack, the injection means being configured to discharge the flue gas into the discharge stack at a fourth temperature,
wherein the third temperature is of a magnitude sufficient to allow the flue gas reheat air to raise the fourth temperature to a magnitude sufficient to mitigate visible plume exiting the discharge stack and to mitigate corrosion in the discharge stack.

23. The system of claim 22, wherein the steam generator system further comprises a selective catalytic reduction system, with the steam generator vessel being in communication with the air preheater through the selective catalytic reduction system.

24. The system of claim 22, wherein the steam generator system further comprises a flue gas reheat air particulate removal system, with the air preheater being in communication with the discharge stack through the flue gas reheat air particulate removal system operatively to remove from the second portion of air particulate contaminants introduced from leakage within the air preheater from the flue gas mixture.

25. The system of claim 22, wherein the steam generator system further comprises a humidity sensor disposed in the communication between the steam generator vessel and the air preheater to measure humidity of the flue gas mixture and with the humidity sensor being used to determine the magnitude of first temperature.

26. The system of claim 22, wherein the steam generator system further comprises an infrared sensor to determine the air preheater temperature and a control unit configured to control the cold end metal temperature above the water dew point in the air preheater.

27. The system of claim 22, wherein the $SO_3$ mitigation means comprises supplying a low sulfur fuel to the steam generator vessel, the low sulfur fuel generating less than 5 parts per million $SO_3$.

28. The system of claim 22, wherein the $SO_3$ mitigation means comprises removing $SO_3$ in the flue gas mixture prior to admitting the flue gas mixture to the air preheater.

29. The system of claim 22, wherein the $SO_3$ mitigation means comprises chemically rendering the $SO_3$ in the flue gas mixture into an inert salt, prior to admitting the flue gas mixture to the air preheater.

30. The system of claim 29, wherein the chemically rendering comprises spraying an aqueous suspension of a reagent containing at least one of sodium, magnesium, potassium, ammonium and calcium thiosulfate and containing at least one soluble salt compound chosen from the group consisting of thiosulfate and chloride species to create a particulate mist containing dry particles of at least one soluble salt compound that can react with the $SO_3$ in the flue gas.

31. The system of claim 22, wherein there no fans disposed between the flue gas desulfurization system and the discharge stack.

32. The system of claim 22, wherein there are no heat exchangers disposed between the air preheater and the flue gas desulfurization system.

33. The system of claim 22, wherein there no fans disposed between the flue gas reheat air particulate removal system and the discharge stack.

34. The system of claim 22, wherein the third temperature is about 52° C. to about 60° C. (125° F. to 140° F.).

35. The system of claim 22, wherein the fourth temperature is at least 68° C. (155° F.).

36. A method for retrofitting a steam generator system for improved effectiveness, the method comprising:
removing at least one heat exchanger positioned downstream of the air preheater:
reconfiguring an air supply source to the air preheater to supply a first amount of air in excess of that required for combustion of fuel in the steam generator vessel and reconfiguring at least one of the air supply source and the air preheater such that the first amount of air is provided at a mass flow sufficient to establish a first temperature of a flue gas mixture exiting the air preheater, the first temperature being such that the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.);
providing $SO_3$ mitigation means in communication with the steam generator vessel, the mitigation means being configured to mitigate the $SO_3$ in the flue gas mixture generated in the steam generator vessel, the mitigating of $SO_3$ occurring before the flue gas mixture enters the air preheater;
configuring the air preheater to heat the first amount of air to a second temperature being substantially no less than the temperature of combustion air of an original system and being about of 288° C. to 399° C. (550° F. to 750° F.) to maintain or improve boiler efficiency;
supplying a first portion of the first amount of air to the steam generator vessel for combustion of the fuel;
discharging the flue gas mixture at the first temperature, directly from the air preheater to the particulate collection system thereby removing particulate from the flue gas mixture and creating a first treated flue gas mixture;
discharging the first treated flue gas mixture from the particulate removal system directly into the flue gas desulfurization system thereby creating in and discharging from the flue gas desulfurization system, a second treated flue gas mixture at a third temperature;
injecting a second portion of the first amount of air as flue gas reheat air fed from the air preheater at the second temperature with the second flue treated flue gas mixture at the third temperature thereby creating third treated flue gas mixture at a fourth temperature, prior to entering the discharge stack; and
admitting the third treated flue gas mixture to the discharge stack at the fourth temperature; and
wherein the third temperature is of a magnitude sufficient to allow the flue gas reheat air to raise the fourth temperature to a magnitude sufficient to mitigate visible plume exiting the discharge stack and to mitigate corrosion in the discharge stack.

37. The method for retrofitting of claim 36, replacing at least a portion of an outlet duct connecting the flue gas desulfurization system and the discharge stack with a manifold that connects the flue gas desulfurization system, an excess air duct and the discharge stack.

38. The method for retrofitting of claim 36, wherein the steam generator system further comprises a flue gas reheat air particulate removal system, with the air preheater being in communication with the discharge stack through the flue gas reheat air particulate removal system; and
removing particulate contaminants from the second portion of air, the particulate contaminants being introduced to the second portion of air from leakage within the air preheater from the flue gas mixture.

39. The method for retrofitting of claim 36, wherein the steam generator system further comprises a humidity sensor disposed in the communication between the steam generator vessel and the air preheater; and
measuring, with the humidity sensor, humidity of the flue gas mixture to determine a magnitude of first temperature.

40. The method for retrofitting of claim 36, wherein the steam generator system further comprises an infrared sensor; and
determining, with the infrared sensor, the cold end metal temperature in the air preheater;
comparing the cold end metal temperature to the water dew point temperature; and
controlling the cold end metal temperature to be no less than the water dew point temperature.

41. The method for retrofitting of claim 36, wherein a second thermal efficiency of the steam generator system, after implementing the retrofit method, is at least as great as a first thermal efficiency of the steam generator system before implementing the retrofit method.

42. The method for retrofitting of claim 36, wherein the third temperature is about 52° C. to about 60° C. (125° F. to 140° F.).

43. The method for retrofitting of claim 36, wherein the fourth temperature is at least 68° C. (155° F.).

44. A method for improving effectiveness of a steam generator system, the method comprising:
- providing a steam generator system comprising a steam generator vessel, an air supply system, an air preheater, a first particulate removal system, a second particulate removal system, a flue gas desulfurization system, and a flue gas discharge stack, with the air supply system being in communication with the steam generator vessel through the air preheater, and with the steam generator vessel being in communication with the discharge stack through the air preheater, the first particulate removal system and the flue gas desulfurization system, with the first particulate removal system being located downstream of the air preheater, with the flue gas desulfurization system being located downstream of the first particulate removal system; with the discharge stack being located downstream of the flue gas desulfurization system and with the air preheater being in communication with the discharge stack through the second particulate removal system;
- providing a humidity sensor disposed between the steam generator vessel and the air preheater;
- providing an infrared sensor in the air preheater;
- measuring humidity of a flue gas mixture with the humidity sensor to determine a magnitude of a first temperature;
- the air supply system providing a first amount of air to the air preheater, the first amount of air being of a magnitude in excess of that required for combustion of fuel in the steam generator vessel and the air preheater providing the first amount of air at a mass flow sufficient to establish a first temperature of a flue gas mixture exiting the air preheater, the first temperature being such that the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.);
- determining, with the infrared sensor, the cold end metal temperature in the air preheater;
- comparing the cold end metal temperature to the water dew point temperature;
- controlling the cold end metal temperature to be no less than the water dew point temperature;
- mitigating $SO_3$ in the flue gas mixture generated in the steam generator vessel, the mitigating of $SO_3$ occurring before the flue gas mixture enters the air preheater;
- configuring the air preheater to heat the first amount of air to a second temperature of about 288° C. to 399° C. (550° F. to 750° F.);
- supplying a first portion of the first amount of air as combustion air to the steam generator vessel for combustion of the fuel;
- discharging the flue gas mixture at the first temperature, directly from the air preheater to the particulate removal system thereby removing particulate from the flue gas mixture and creating a first treated flue gas mixture;
- discharging the first treated flue gas mixture from the particulate removal system directly into the flue gas desulfurization system thereby creating in and discharging from the flue gas desulfurization system, a second treated flue gas mixture at a third temperature of 52° C. to 60° C. (125° F. to 140° F.);
- removing particulate contaminants from the second portion of air, the particulate contaminants being introduced to the second portion of air from leakage within the air preheater from the flue gas mixture;
- injecting a second portion of the first amount of air as flue gas reheat air fed from the air preheater at the second temperature with the second flue treated flue gas mixture at the third temperature thereby creating third treated flue gas mixture at a fourth temperature of at least 68° C. (155° F.), prior to entering the discharge stack; and
- admitting the third treated flue gas mixture to the discharge stack at the fourth temperature.

* * * * *